(12) United States Patent
Sadler

(10) Patent No.: US 6,856,964 B1
(45) Date of Patent: Feb. 15, 2005

(54) SYSTEM AND METHODS FOR INTEGRATING A SELF-CHECKOUT SYSTEM INTO AN EXISTING STORE SYSTEM

(75) Inventor: Robert F. Sadler, Cumming, GA (US)

(73) Assignee: NCR Corporation, Dayton, OH (US)

( * ) Notice: Subject to any disclaimer, the term of this patent is extended or adjusted under 35 U.S.C. 154(b) by 783 days.

(21) Appl. No.: 09/273,363

(22) Filed: Mar. 22, 1999

(51) Int. Cl.[7] .............................................. G06F 17/60
(52) U.S. Cl. .............................. 705/16; 705/21; 705/17; 705/1; 705/500; 703/27
(58) Field of Search .............................. 705/16, 17, 21, 705/1, 500; 710/8, 12, 15, 21, 46; 717/138

(56) References Cited

U.S. PATENT DOCUMENTS

| | | | |
|---|---|---|---|
| 4,729,097 A | | 3/1988 | Takaoka et al. ............... 705/16 |
| 5,239,662 A | * | 8/1993 | Danielson et al. ........... 709/246 |
| 5,494,136 A | | 2/1996 | Humble ........................ 186/61 |
| 5,992,570 A | | 11/1999 | Walter et al. ................. 186/36 |
| 6,108,717 A | | 8/2000 | Kimura et al. ................. 710/8 |

* cited by examiner

Primary Examiner—Tariq R. Hafiz
Assistant Examiner—Akiba Robinson-Boyce
(74) Attorney, Agent, or Firm—Priest & Goldstein, PLLC

(57) ABSTRACT

A self-checkout terminal system includes a self-checkout core application module for controlling a self-checkout terminal, the self-checkout core application module controlling peripheral input and output devices at the self-checkout terminal for receiving inputs from, and providing outputs to, a retail customer. An emulator module connected to the self-checkout core application module emulates, independent from the self-checkout core application, a native vendor software application in a network of cashier-operated checkout terminals administered by a vendor server computer, the emulator module passing commands and data to, and receiving commands and data from, the vendor server. The self-checkout core application converts inputs received at the peripheral input devices into inputs expected by the emulated native vendor software application, and converts device update outputs from the emulated native vendor software application into updates to the peripheral output devices.

13 Claims, 4 Drawing Sheets

SYSTEM AND METHODS FOR INTEGRATING A SELF-CHECKOUT SYSTEM INTO AN EXISTING STORE SYSTEM

BACKGROUND OF THE INVENTION

1. Field of the Invention

The present invention relates generally to improvements to retail self-checkout systems, and more particularly to advantageous aspects of a system and methods for integrating a self-checkout system into an existing store system.

2. Description of the Prior Art

In many current retail establishments, the checkout function is performed by cashiers, who operate checkout terminals connected into a network. At the hub of the network is a central server computer that accesses a database to provide pricing and product information, as requested by each terminal. The software that is run by the server computer and by the terminals is highly system-specific.

Recently, retail stores have started to introduce self-checkout terminals, at which the checkout function is performed by the retail customer, rather than by a store employee. However, it has proved to be difficult to integrate a self-checkout terminal into an already existing network of cashier-operated checkout terminals. Self-checkout systems in retail environments require tight integration with the store's retail software and its policies and procedures for store personnel.

Previous systems have attempted to address this by either attempting to rewrite the original software already in use in the store's other lanes or by sharing the store's data files with an original application that is different from the store's normal application. Both solutions have problems. First, using shared data alone can lead to incorrect pricing algorithms being employed, which usually results in prices being different in the self-checkout lane from the same items purchased in another lane. Second, rewriting the store's current application is expensive, time consuming, and creates a system that requires all changes to be duplicated in another code base.

There is thus a need for a system for integrating a self-checkout system into an already existing store system.

SUMMARY OF THE INVENTION

A first embodiment of the invention provides a self-checkout terminal system, comprising a self-checkout core application module for controlling a self-checkout terminal, the self-checkout core application module controlling peripheral input and output devices at the self-checkout terminal for receiving inputs from, and providing outputs to, a retail customer. An emulator module connected to the self-checkout core application module emulates, independent from the self-checkout core application, a native vendor software application in a network of cashier-operated checkout terminals administered by a vendor server computer, the emulator module passing commands and data to, and receiving commands and data from, the vendor server. The self-checkout core application converts inputs received at the peripheral input devices into inputs expected by the emulated native vendor software application, and converts device update outputs from the emulated native vendor software application into updates to the peripheral output devices.

Additional features and advantages of the present invention will become apparent by reference to the following detailed description and accompanying drawings.

DETAILED DESCRIPTION

Figure 1:
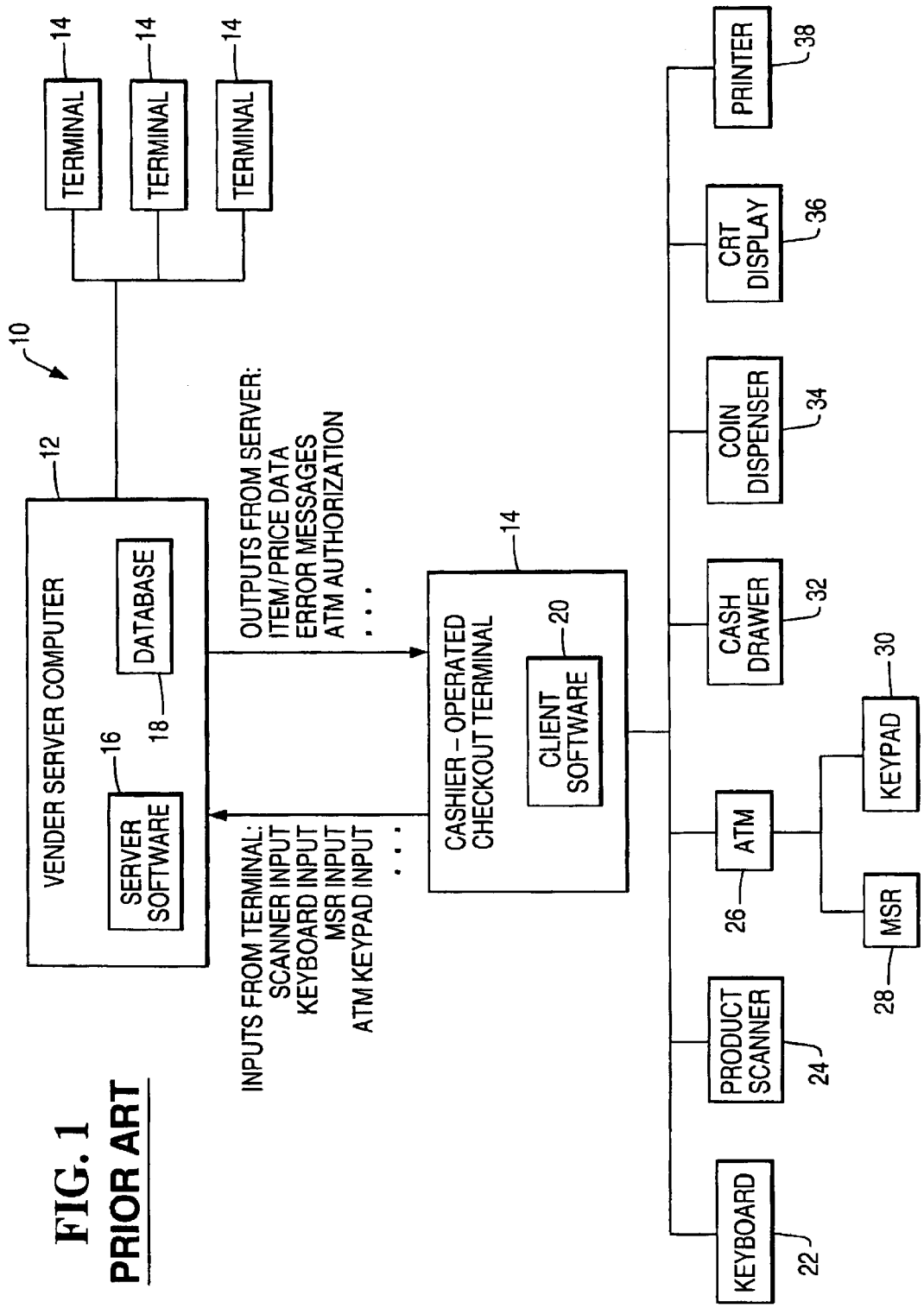
FIG. 1 shows a diagram of a retail checkout network according to the prior art.

FIG. 1 shows a diagram of a retail checkout network 10 according to the prior art. The network 10 includes a central server computer 12 and a number of remote terminals 14 connected to the server 12. The server 12 includes server software 16 and a database 18 containing information needed to perform the checkout function, including item codes, descriptions, prices, etc. Server software typically includes an operating system, device drivers, a communication protocol stack, and runtime configuration tools. In addition, the server software may include applications such as Electronic Funds Transfer, Translation Programs, Electronic Journal (EJ) Application, and Back Office Functionality.

Each checkout terminal 14 includes client software 20 for interacting with the server computer 12. The client software 20 also controls a number of input and output devices. These may suitably include a keyboard 22 for receiving inputs from a cashier, a product scanner 24 for scanning UPC codes, an ATM machine 26 having a magnetic strip reader 28 and a keypad 30, a cash drawer 32, a coin dispenser 34, a cathode ray tube display 36, and a printer 38. Depending upon the needs of the particular retailer, other configurations of devices may be used.

During a retail transaction, the checkout terminal 14 receives inputs at the various peripheral devices and passes these inputs to the server computer 12 along with an appropriate request for information. In response to the request, the server computer 12 looks up the requested information in the database 18 and then passes the information back to the checkout terminal 14 for output at an appropriate device. Thus, for example, a cashier may scan the UPC code on a can of vegetables at scanner 24. The scanned code is then passed to the server computer 12 with a request for price information, which is looked up in database 18. The price and item identification information is then returned to the terminal 14, which causes the price and item identification information to be displayed at the CRT display 36 and printed onto a paper receipt at printer 38. Depending upon the particular transaction being processed, different sequences of inputs and outputs are exchanged between the checkout terminal 14 and the server computer 12.

The complexity and highly specific nature of the client/server software required to operate a retail checkout network such as the one shown in FIG. 1 creates difficulties in designing a self-checkout terminal to be integrated into an already existing network of retail checkout network.

In a self-checkout terminal, as its name implies, the functions normally performed by a human cashier are instead performed by the retail customer. Some of the peripheral devices on a self-checkout terminal are substantially identical to those in a traditional, cashier-operated terminal. For example, both terminals make use of scanners to scan UPC codes on items to be checked out, as well as printers to print paper receipts.

However, because there is no human cashier to monitor and assist in the transaction, a self-checkout terminal must also include a number of unique hardware and software components. These include modules to provide instructions and cues to the retail customer, as well as security modules that, for example, ensure that the proper item has been scanned. In addition, a self-checkout terminal may include hardware and software components that facilitate remote approvals of purchases that are restricted by age, such as tobacco or alcohol. Thus, the software used to control a self-checkout terminal is typically highly specific to that terminal.

There are currently a number of different environments for networks of cashier-operated retail checkout terminals. These include, for example, the IBM 4690 and the NCR MTX environments. In developing retail self-checkout terminals for use in these already existing environments, one approach would be to rewrite and adapt the already existing software used in these environments. However, this would be a time-consuming and inefficient process, and would have to be performed for each separate environment in which it is desired to add self-checkout terminals.

An alternative approach would be to develop self-checkout terminals that access the data contained in an already existing network, independently of the software used by the network. However, this approach can lead to pricing errors if different algorithms are used by the self-checkout terminals and by the already existing cashier-operated terminals. In such a case, it would be possible for the prices charged at the self-checkout terminals to differ from the prices charged at the cashier-operated terminals.

The present invention provides a system and methods for integrating a self-checkout terminal into an already existing cashier-operated terminal environment without the need to rewrite already existing code and without the above-mentioned risk of pricing errors. In particular, the present invention integrates the actual application code that the store is running in its other lanes, while isolating the unique self-checkout features into another application. Thus, functionality that is already in the store system will be preserved, and new behavior necessary for self-checkout will exist outside the store's current application.

In this approach, the self-checkout terminal is a client in a network served by the vendor server computer. At the self-checkout terminal client, the highest software level is the checkout application. According to the present invention, the checkout application is integrated with the existing vendor's native application by running concurrently on the self-checkout terminal hardware both (1) software specific to the self-checkout terminal and (2) the vendor's native application. This arrangement provides the capability of executing the vendor's binary in an OS emulation mode. Thus, the existing retailer's application (with customizations) is run with its I/O mapped to the self-checkout terminal's common platform presentation services and device manager components. Communication between the self-checkout terminal application and the vendor application is handled via a communication channel, such as an NT named pipe. However, only the self-checkout terminal software will interact with the user of the self-checkout terminal, i.e., the retail customer performing the self-checkout function.

Figure 2:
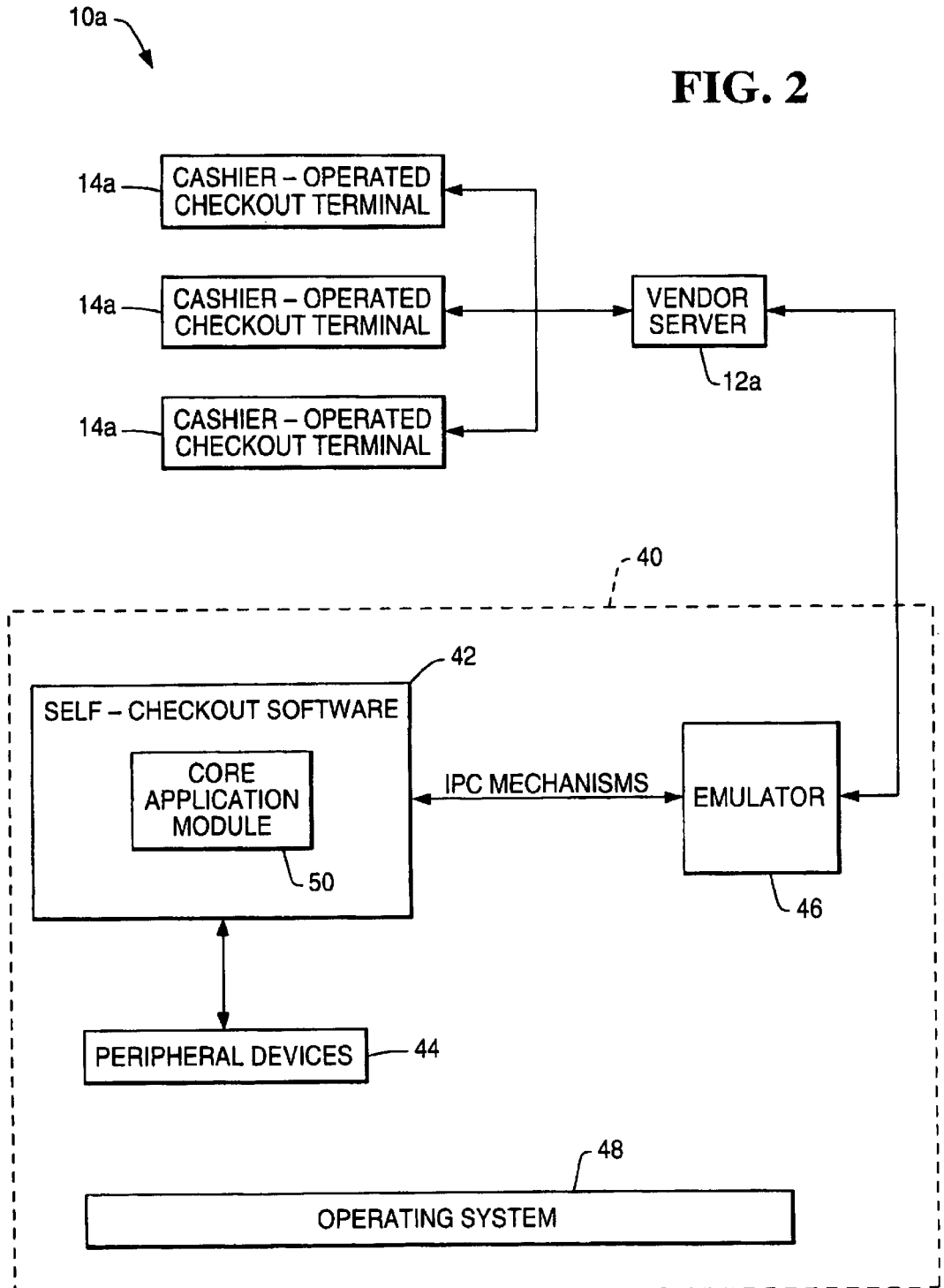
FIG. 2 shows a diagram of a first embodiment of a retail checkout network, in which a self-checkout terminal has been integrated according to the present invention.

FIG. 2 shows a general diagram of a first embodiment of a system 10a according to the present invention, in which a self-checkout terminal 40 has been connected into an already existing network of cashier-operated checkout terminals 14a. The self-checkout terminal includes self-checkout software 42 that performs all of the required self-checkout functions in conjunction with a set of self-checkout peripheral devices 44.

The interface between the self-checkout core application 42 and the already existing vendor server 12a is provided by an emulator module 46. As described in further detail below, the emulator 46 runs the same software as the cashier-operated terminals 14a connected into the network 10a. Thus, from the point of view of the server 12a, the self-checkout terminal 40 functions identically to a cashier-operated terminal 14a, providing the same inputs to the server 12a, and receiving the same outputs from the server 12a.

The emulator 46 runs exactly the same software that is already being run by the cashier-operated terminals 14a. There is thus no need to rewrite or adapt that software. However, of course, the self-checkout terminal 40 must be customized in order to work with the particular software package already in use by the already existing network of checkout terminals 14a. This customization takes place in a core application module, discussed in greater detail below. The interface between the emulator module and the core application module is provided by an interprocess communications link (IPC). IPC is a capability supported by the operating system 48 that allows one process to communicate with another, enables one application to control another application, and allows several applications to share the same data without interfering with each other. In the presently preferred embodiment, the operating system used is Windows NT 4.0, although other multiprocessing systems can also be used, as desired. The IPC used in the present system is Microsoft's object linking and embedding standard (OLE). It is expected that the server will run either UNIX or NT operating systems and employ Ethernet or Token Ring Topologies.

Figure 3:
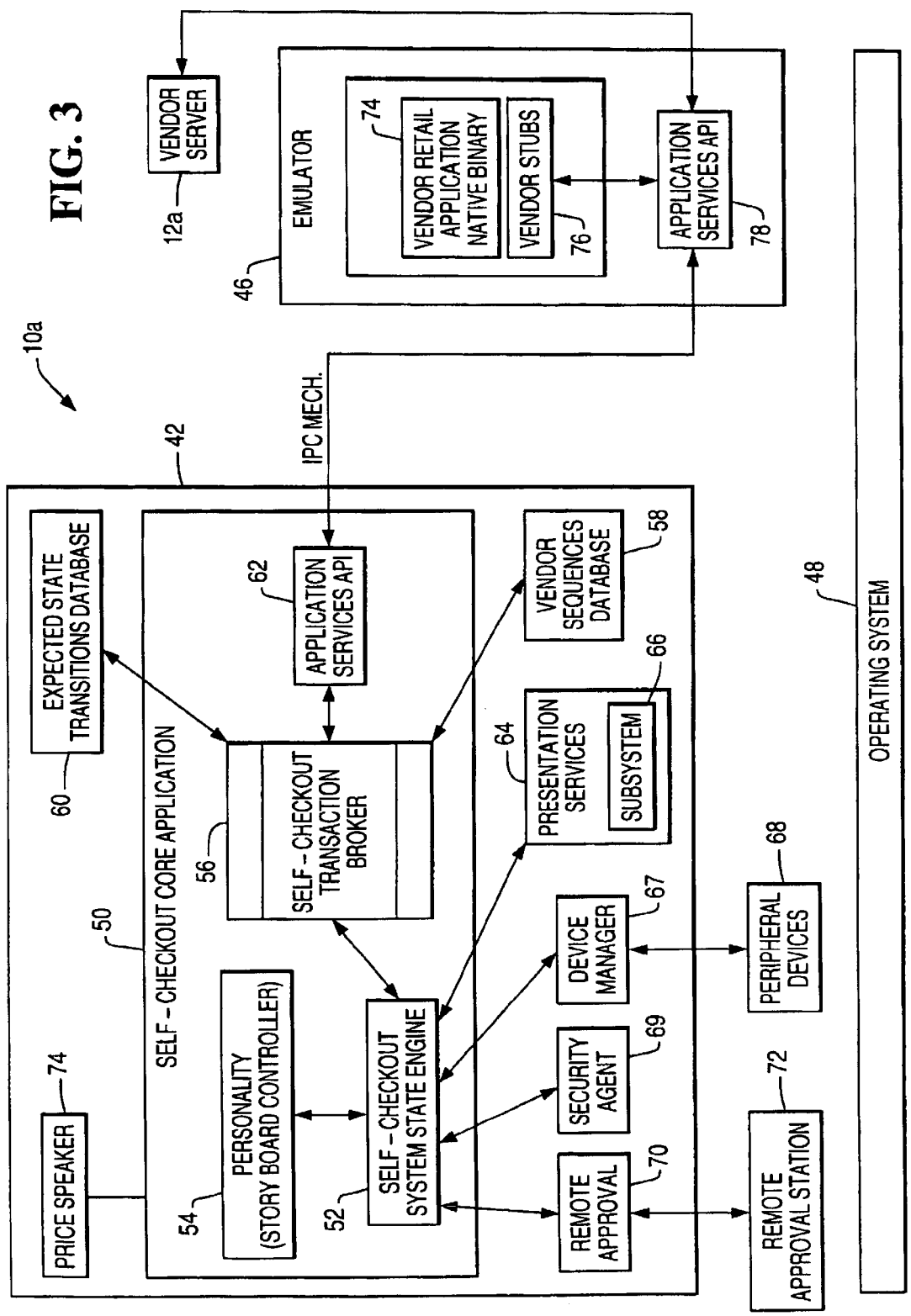
FIG. 3 shows the FIG. 2 network in greater detail.

FIG. 3 shows a more detailed diagram of the embodiment of the invention shown in FIG. 2. Elements 56, 58, 60, 74, 76 and 78 of FIG. 3 indicate those portions of the system that are customized for the particular vendor software that is used in the already existing terminal network. The heart of the self-checkout terminal is core application software module 50. It is this module that provides the central control of the other software modules included in terminal software 42. The core application module 50 includes a system state engine 52, which is a module, including tables, that manages the state of the application. The core application module is connected to a personality, or storyboard controller 54, which is a module that controls the look and feel of the application in relation to the constraints of the emulator 46.

The system state engine is connected to a transaction broker module 56, which is preferably a dynamic link library (DLL) that can be replaced depending upon the environment in which the system is running. It is designed to provide the calls to perform point-of-sale functions with the emulated application, while providing a standard set of functions for the core application to use to communicate with the emulated application. For example, the transaction broker module 56 can provide a standard sign-on function that can allow a self-checkout terminal to sign on at the beginning of a transaction. The keys required to sign on vary from application to application, so this module would be different for each point-of-sale environment.

The transaction broker module 56 accesses data from two databases, a vendor sequences database 58 and an expected state transitions database 60. The vendor sequences database 58 contains data used by the transaction broker 56 to hold key sequences required to perform the function set of the transaction broker 56. The expected state transitions database 60 is used to control the state of the emulated application.

The Application Services API (ASA) module 62 is an applications programming interface that is designed to allow the self-checkout terminal access to a native vendor point-of-sale application, including all device output handles in the interface between the vendor application and the self-checkout terminal. The ASA module 62 also allows for sending keyboard sequences back to the vendor application. Access is accomplished through the use of 32-bit Windows NT programs that either emulate the native application or provide an environment in which to execute the native application binary. This interface is implemented as a named pipe, i.e., as a temporary software connection for passing data among the self-checkout transaction broker 56, the emulator 46, and the vendor server 12a.

As shown in FIG. 3, in addition to the core application module, the self-checkout terminal includes a number of additional modules. The presentation services module 64 provides: configurable static presentation data, including formatting information, without having to rebuild the application; support for screen layout and storyboards; and presentation services for a display and passive camera. A presentation service subsystem 66 provides: (1) an application interface module and (2) a display presentation module, which handles requests by the presentation services module to the cathode-ray tube (CRT) display device.

The device manager module 67 provides a 32-bit interface between the self-checkout terminal core application 50 and the OPOS (Object Linking and Embedding for Retail Point of Sale) and OPOS-like devices 68 supported by the self-checkout terminal platform. In addition, the device manager module 67 maintains input sequencing for the self-checkout terminal.

The peripheral devices 68 supported by the present system include a printer, card reader, encryptor/PINpad, cash changer (note/coin dispensing), cash acceptor, lane light and media entry indicators (MEI's).

The security agent module 69 detects and reports predetermined security events. It collates information to make decisions about actions to take concerning detected breaches in security. These security events include, for example, a determination by the self-checkout terminal that a scanned UPC code does not correspond to the item being scanned.

The remote approval module 70 provides an interface to a remote approval station 72. This module is used when the transaction being processed at the self-checkout terminal requires approval from store personnel. This could occur, for example, where the customer is purchasing an age-restricted item, such as tobacco or alcohol.

The price speaker module 74 is used to speak the price of an item so that the customer need not be looking at the screen when scanning items. It consists of .wav files and the logic to string those .wav files together to construct a natural-sounding speech sound announcing a price.

The emulator 46, as discussed above, is a module that runs the vendor retail application 74, independently of the self-checkout terminal software 42. In order to facilitate the running of the vendor retail application in the emulator 46, vendor stubs 76 are provided. These stubs 76 are basically a set of dummy routines that function as placeholders for commands and data as they are passed back and forth between the vendor server 12a, the vendor client software 74 run by the emulator 46, and the self-checkout terminal software 42. The emulator includes an application services API module 78 that provides an interface between the self-checkout core application 50, the native vendor application 74, and the vendor server 12a.

Figure 4:
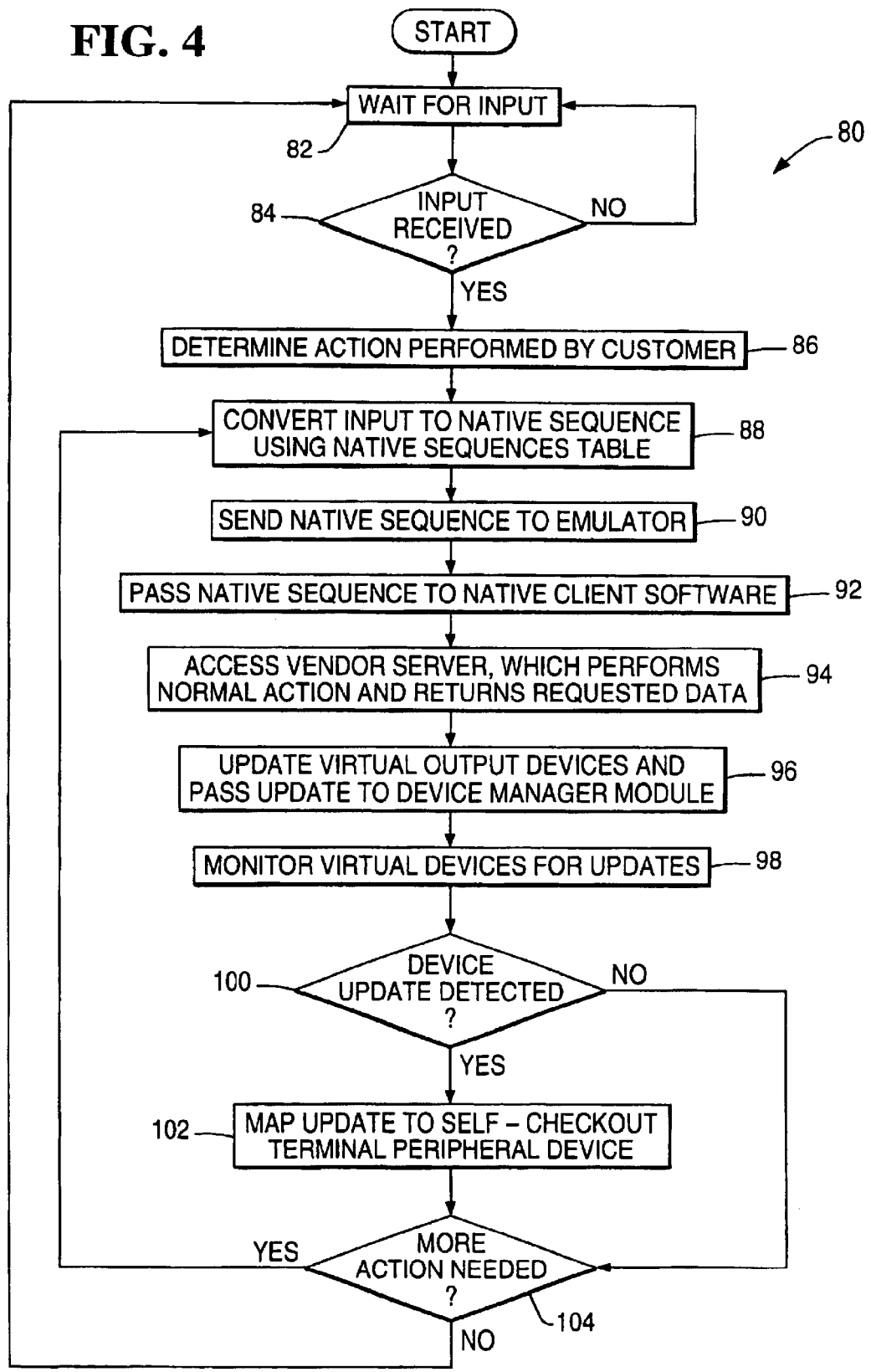
FIG. 4 shows a flowchart of a method according to the present invention for integrating a self-checkout terminal into an already existing retail checkout network.

FIG. 4 shows a flow chart of a first embodiment of a method 80 according to the present invention. In first step 82, the self-checkout system waits for an input from a customer at one of the peripheral devices 68. The customer input could be, for example, scanning a product's UPC code. Once the system determines in step 84 that an input has been received, the system determines in step 86, from the detected input, what action the customer has taken.

In step 88, the system accesses the native vendor sequences database 58 and uses the data contained therein to convert the customer action into a native sequence, i.e., into a sequence that can be understood by the vendor's already existing software. In step 20, the native sequence is sent to the emulator 46. The emulator 46 passes the sequence to the store's native application 74 in step 92. The native application 74, then functions in the same manner as the client software in an already existing cashier-operated terminal. In step 94, the client software accesses the vendor server, which performs its normal function and returns requested data to the emulated client software.

Once the requested data has been returned to the emulated client software, that software updates the virtual peripheral devices in step 96. These updates are passed to the device manager module. In step 98, the self-checkout system monitors the virtual devices to detect any updates. In step 100, the device detects the presence of a device update. If a device update is detected, then in step 102, the device update is mapped to the appropriate self-checkout terminal peripheral device.

In step 104, the system determines whether any additional action is required. If additional action is required, the system repeats steps 88–104. If no additional action is required, the system returns to its waiting state in step 82.

Thus, for example, in a typical transaction, a customer will scan an item's UPC bar code using a scanner at the self-checkout terminal. The UPC code is then passed to the self-checkout core application by the device manager. The state engine passes the UPC code to the self-checkout transaction broker which, using the expected state transitions database, constructs the correct sequence expected by the store's native application. This sequence is then delivered via the IPC mechanism to the emulator module. There, the emulated vendor retail application treats the input as if the item had been scanned on a cashier-operated terminal. The code is passed to the vendor server, which performs a PLU lookup, and returns the requested data to the emulated native application.

In a cashier-operated terminal, the native retail application would send the returned data to the requisite output devices, for example, a printer and/or and operator display. However, in the emulated native retail application, these device updates are intercepted by the emulator, and then passed to the self-checkout core application via the IPC mechanisms. When the self-checkout core application detects a device update, it maps the output to the appropriate self-checkout terminal peripheral device, thereby communicating the output to the shopper.

While the foregoing description includes detail which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

I claim:

1. A self-checkout terminal system, comprising:

a self-checkout core application module for controlling a self-checkout terminal, the self-checkout core application module controlling peripheral input and output devices at the self-checkout terminal for receiving inputs from, and providing outputs to, a retail customer;

an emulator module connected to the self-checkout core application module for emulating, independent from the self-checkout core application, a native vendor software application in a network of cashier-operated checkout terminals administered by a vendor server computer, the emulator module passing commands and data to, and receiving commands and data from, the vendor server, the self-checkout core application converting inputs received at the peripheral input devices into inputs expected by the emulated native vendor software application, and converting device update outputs from the emulated native vendor software application into updates to the peripheral output devices.

2. The system of claim 1, wherein the self-checkout core application module includes a transaction broker module for performing the function of converting inputs received at the peripheral input devices into inputs expected by the emulated native vendor software application, and converting device update outputs from the emulated native vendor software application into updates to the peripheral output devices.

3. The system of claim 2, wherein the transaction broker module is a replaceable dynamic link library (DLL).

4. The system of claim 2, wherein the transaction broker module performs the conversion function by accessing a vendor sequences database containing key sequences used by the emulated native vendor software and an expected state transitions database containing state transitions used by the emulated native vendor software.

5. The system of claim 1, wherein the emulator includes vendor stubs that act as placeholders for commands and data passed back and forth between the self-checkout core application, the emulated native vendor software, and the vendor server.

6. The system of claim 1, further comprising:

interprocess communications for providing an interface between the self-checkout core application and the emulator.

7. The system of claim 6, wherein the emulator includes an application services interface for providing an interface between the self-checkout core application, the emulated native client/server software application, and the vendor server computer.

8. The system of claim 1, further including a device manager module connected to the self-checkout core application for controlling the self-checkout terminal peripheral input and output devices.

9. The system of claim 8, wherein the emulator intercepts device update outputs from the emulated native software application and passes them to the self-checkout core application, where they are mapped to an appropriate self-checkout terminal peripheral output device controlled by the device manager module.

10. A method for integrating a self-checkout terminal into an already existing network of retail terminals administered by a vendor server computer, the method comprising:

(a) providing a self-checkout core application that is run by the self-checkout terminal and that controls peripheral input and output devices at the self-checkout terminal for receiving inputs from, and providing outputs to, a retail customer;

(b) providing an emulator module connected to the self-checkout core application that emulates a native vendor software application in the already existing network of retail terminals and that passes data and commands to, and receives data and commands from, the vendor server computer; and (c) converting inputs received at the peripheral input devices into inputs expected by the emulated native vendor software application, and converting device update outputs from the emulated native vendor software application into updates to the peripheral output devices.

11. The method of claim 10, wherein step (c) includes the following substeps:

(1) waiting for an input at the peripheral input devices;

(2) determining the action performed by the retail customer if an input is received;

(3) converting the input into a native sequence;

(4) sending the native sequence to the emulator module;

(5) passing the native sequence to the emulated native vendor software application;

(6) accessing the vendor server to obtain data requested by the emulated native vendor software application;

(7) mapping outputs from the emulated native vendor software application to selected self-checkout terminal peripheral output devices;

(8) returning to substep (3) if additional action is required; and (9) returning to substep (1) if no additional action is required.

12. The method of claim 11, wherein substep (3) includes accessing a native sequences table.

13. The method of claim 11, wherein substep (7) includes:

(7a) using the emulated native vendor software to update virtual output devices;

(7b) monitoring the virtual output devices for updates;

(7c) mapping detected device updates to selected self-checkout terminal peripheral output devices.

* * * * *